(12) United States Patent
Osaka et al.

(10) Patent No.: US 6,222,703 B1
(45) Date of Patent: Apr. 24, 2001

(54) MAGNETIC HEAD FOR READING FROM AND WRITING TO A ROTATED MAGNETIC DISC IN AN ELEVATED STATE PRODUCED BY AIR FLOW AND STRUCTURE FOR SUPPORTING SAME

(75) Inventors: Tomohiko Osaka; Norikazu Kudo, both of Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/232,127

(22) Filed: Jan. 15, 1999

(30) Foreign Application Priority Data

Feb. 4, 1998 (JP) .................................................. 10-023149

(51) Int. Cl.[7] ...................................................... G11B 5/60
(52) U.S. Cl. .................................. 360/236.8; 360/246.6; 360/246.8
(58) Field of Search ............................... 360/103, 236.8, 360/246.2, 246.6, 246.8

(56) References Cited

U.S. PATENT DOCUMENTS

| | | | |
|---|---|---|---|
| 4,191,980 | * 3/1980 | King | 360/103 |
| 5,128,821 | 7/1992 | Takeuchi et al. | 360/103 |
| 5,377,063 | 12/1994 | Taniguchi et al. | 360/103 |
| 5,907,457 | * 5/1999 | Kudo | 360/103 |
| 6,023,393 | * 2/2000 | White | 360/103 |

FOREIGN PATENT DOCUMENTS

| | | |
|---|---|---|
| 0237752 | 9/1987 | (EP) . |
| 0423661 | 4/1991 | (EP) . |
| 0466502 | 1/1992 | (EP) . |
| 0747890 | 12/1996 | (EP) . |
| 4170711 | 6/1992 | (JP) . |
| 6028804 | 2/1994 | (JP) . |
| 96/27873 | 9/1996 | (WO) . |

* cited by examiner

Primary Examiner—A. J. Heinz
(74) Attorney, Agent, or Firm—Ladas & Parry

(57) ABSTRACT

A slider of a magnetic head is provided with first and second magnetic head parts, and a central groove so that first and second air bearing surfaces separate from each other are formed. An air flow produced between the air bearing surfaces, and a magnetic disk creates an elevating force. A width of the first air bearing surface at the leading edge is controlled to be larger than a width at the trailing edge.

18 Claims, 14 Drawing Sheets

PRIOR ART

PRIOR ART

PRIOR ART

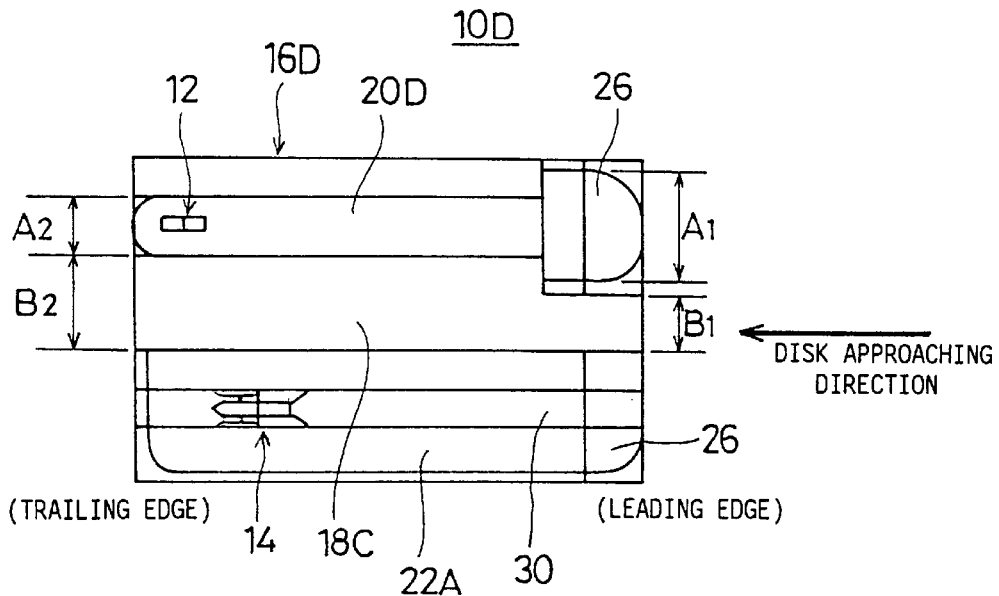
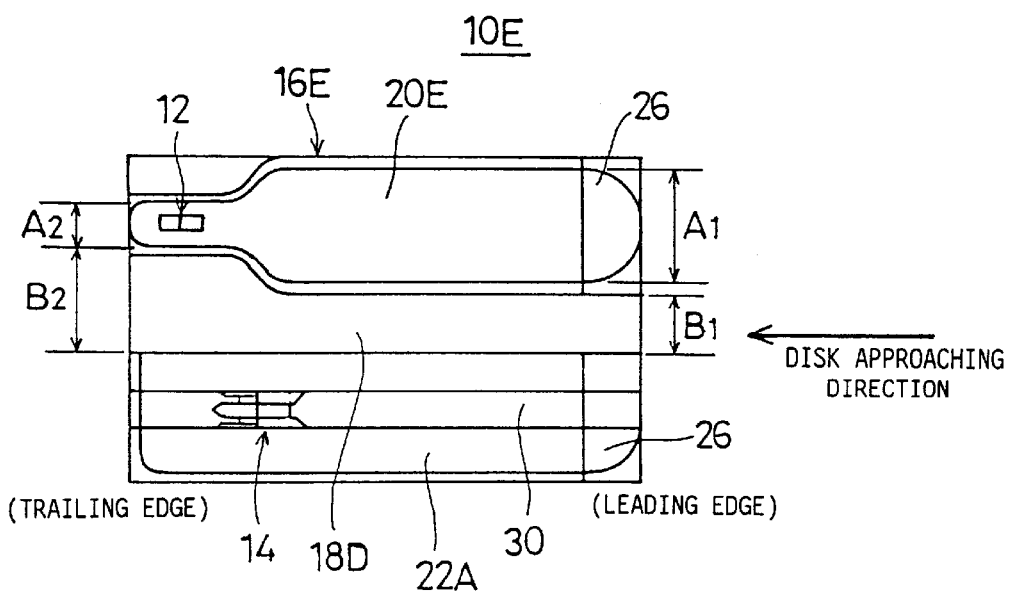

MAGNETIC HEAD FOR READING FROM AND WRITING TO A ROTATED MAGNETIC DISC IN AN ELEVATED STATE PRODUCED BY AIR FLOW AND STRUCTURE FOR SUPPORTING SAME

BACKGROUND OF THE INVENTION

1. Field of the Invention

The present invention generally relates to magnetic heads and structures for supporting the same and, more particularly, to a magnetic head for reading from and writing to a rotated medium (magnetic disk) in an elevated state produced by an air flow occurring between the head and the medium, and to a supporting structure for such a magnetic head.

2. Description of the Related Art

Generally, an ordinary magnetic disk device that uses a flexible magnetic disk having a coercive force of 900 oersted (Oe) or below as a magnetic recording medium allows a relatively low rotational speed of 300 rpm. In this case, magnetic reading and writing is performed by causing the magnetic head to be in direct sliding contact with the magnetic disk.

However, with the advancement of high-density recording on the magnetic disk, magnetic disk devices which allow a high rotational speed (for example, 3000 rpm) of a magnetic disk and use a magnetic disk having a coercive force of more than 1500 Oe (hereinafter, such a magnetic disk will be referred to as a high-capacity magnetic disk) and a magnetic head having a narrow gap are available. Such a magnetic disk device will be referred to as a high-capacity magnetic disk device.

Since a high-capacity magnetic disk device allows a high rotational speed of the disk, the magnetic disk and the magnetic head used therein may easily be damaged when the magnetic head is caused to be in direct contact with the magnetic disk, as is done in a conventional magnetic disk device.

In this background, a high-capacity magnetic disk device is designed such that the magnetic head flies over the high-capacity magnetic disk due to an elevating force occurring as a result of a change in the course of an air flow caused by a relative speed between a slider surface of the magnetic head and the magnetic disk. Magnetic reading and writing is performed while a non-contact state is maintained.

FIGS. 1 through 5 show magnetic heads used in a high-capacity magnetic disk device according to the related art.

As shown in FIGS. 1 and 2, a magnetic head 1 according to the related art generally comprises a slider 2 and a magnetic head part 3. The slider 2 holds the magnetic head part 3 and causes the magnetic head part 3 to float over a magnetic disk 6.

The slider 2 has an air bearing surface forming an air bearing with respect to the magnetic disk 6. A central groove 2a is provided on the center of the upper surface of the slider 2. Referring to FIG. 2, the central groove 2a partitions the air bearing surface into a first air bearing surface 2b located to the right side and a second air bearing surface 5 located to the left side.

The magnetic head part 3 is located in the first air bearing surface 2b. The first air bearing surface 2b is also provided with a pair of slots 4. The magnetic head part 3 for performing magnetic reading and writing is formed by sandwiching a gap member between thin plates of magnetic cores.

The slots 4 extend in a tangential direction of the magnetic disk 6 (in the X direction indicated in FIG. 2) and provides a vent to an air flow produced between the magnetic disk 6 and the first air bearing surface 2b. By providing a vent to the air flow produced between the magnetic disk 6 and the first air bearing surface 2b, an elevating force exerted on the magnetic head 1 is reduced. Thus, by providing the slots 4, the elevating force with respect to the magnetic head 1 can be controlled.

As described above, the second air bearing surface 5 is formed to the left of the central groove 2a. Like the first air bearing surface 2b, the second air bearing surface 5 also produces a force for elevating the magnetic head 1.

FIG. 3 is a lateral sectional view taken from a position of disk insertion. As shown in FIG. 3, a pair of magnetic heads 1 are supported so as to be opposite to each other. The elevating force produced due to the presence of the second air bearing surface 5 provides a force to push the magnetic disk 6 toward the first air bearing surface 2b (that is, the magnetic head part 3) of the opposite magnetic head 1. Accordingly, the second air bearing surface 5 also acts as a pressure pad for pressing the magnetic disk 6 toward the opposite magnetic head 1.

As described above, the slots 4 are formed in the first air bearing surface 2b. The slots 4 provide a vent to the air flow produced between the magnetic disk 6 and the first air bearing surface 2b, thus reducing an elevating force exerted on the magnetic head 1. As a result of this, the rotated magnetic disk 6 between the pair of magnetic heads 1 is deformed such that it is warped toward a gap part 3a of the magnetic head part 3 due to a negative pressure generated in the slot 4 and due to a pressure generated due to the presence of the second air bearing surface 5 as a result of a change in the course of the air flow. With this construction, it is ensured that a magnetic reading and writing process with respect to the magnetic disk 6 is properly performed using the floating magnetic head 1.

A description will now be given, with reference to FIGS. 4 and 5, of how the magnetic head 1 faces the magnetic disk 6. FIGS. 4 and 5 are views of the magnetic head 1 performing a magnetic reading and writing process, taken in a radial direction (Y direction) of the magnetic disk 6.

FIG. 4 shows a state where the magnetic disk 6 approaches the magnetic head 1 in a normal profile, that is, with a normal magnitude of clearance from the magnetic disk 6.

As shown in FIG. 4, a pair of slots 4 are formed in the first air bearing surface 2b in which the magnetic head part 3 is formed. Referring also to FIG. 2, the slots 4 are formed along the entire length of the first air bearing surface 2b (that is, in the X direction shown in FIG. 4) so as to extend from a leading edge 7 to a trailing edge 8 (an edge of the magnetic head 1 at which the magnetic disk 6 leaves the magnetic head 1). Therefore, reduction in the elevating force due to the presence of the slots 4 is produced over the entire extent of the length of the first air bearing surface 2b.

Accordingly, even when the magnetic disk 6 approaches the magnetic head 1 in a normal profile, a distance H between the magnetic disk 6 and the leading edge 7 at an entrance of a space over the magnetic head 1 according to the above construction is smaller than the corresponding distance in a construction in which the slots 4 are not provided.

With such a construction, the magnetic disk 6 is maintained in close proximity to the magnetic head part 3 as a result of the reduction in the elevating force caused by the slots 4, thus providing a proper magnetic reading and writing performance.

FIG. 5 shows a state where the magnetic disk 6 approaching the magnetic head 1 is lower than the magnetic disk 6 shown in FIG. 4. Such a small-clearance approach results from inherent flexibility of the magnetic disk 6 or an error in the configuration of the magnetic disk 6 occurring in the process of fabrication.

When the magnetic head 1 approaches the magnetic disk 6 with a small clearance from the magnetic disk 6, the distance H is reduced to such an extent that the magnetic disk 6 may come into contact with the leading edge 7 so that the magnetic disk 6 or the leading edge 7 may be damaged.

Summary of the Invention

Accordingly, an object of the present invention is to provide a magnetic head and a structure for supporting the same in which the magnetic reading and writing performance is properly maintained and contact between a medium and a slider is reliably prevented.

The aforementioned objects can be achieved by a magnetic head characterized by comprising: a first magnetic head part for performing a reading and writing process on a first flexible medium; a second magnetic head part for performing a reading and writing process on a flexible second medium having a lower coercive force than the first flexible medium; and a slider for supporting the first magnetic head part and the second magnetic head part, the slider being provided with a central groove that produces a a first air bearing surface provided with the first magnetic head part and a second air bearing surface provided with the second magnetic head part, so that an elevating force is produced due to an air flow between the first and second air bearing surfaces and one of the first flexible medium and the second flexible medium in rotation, wherein given that, in a direction perpendicular to a direction in which one of the first flexible medium and the second flexible medium moves, the first air bearing surface has a width A1 at a leading edge thereof facing the approaching medium, and a corresponding width A2 at a trailing edge thereof facing the medium leaving the magnetic head, the width A2 at the trailing edge is set to be smaller than the width A1 at the leading edge (A1>A2).

By setting the width A1, in a direction perpendicular to the direction in which a medium moves, of the first air bearing surface at the leading edge thereof facing the approaching medium to be larger than the width A2 at the trailing edge facing the medium leaving the magnetic head, contact between the leading edge of the slider and the medium is prevented and the magnetic head part is brought to close proximity to the medium.

The elevating force produced between the first air bearing surface and the medium is related to an area of the first air bearing surface such that the larger the area of the first air bearing surface, the larger the elevating force. Therefore, by setting the width A2 of the first air bearing surface at the trailing edge thereof to be smaller than the width A1 at the leading edge (A1>A2), the area at the trailing edge is set to be smaller than the area at the leading edge. Thus, the elevating force produced between the first air bearing surface and the medium is larger at the leading edge than at the trailing edge.

With this construction, contact between the leading edge of the slider and the medium is prevented, and the first magnetic head part provided adjacent to the trailing edge (removed from the leading edge) is brought to close proximity to the medium.

The aforementioned objects can also be achieved by a magnetic head characterized by comprising: a first magnetic head part for performing a reading and writing process on a first flexible medium; a second magnetic head part for performing a reading and writing process on a flexible second medium having a lower coercive force than the first flexible medium; and a slider for supporting the first magnetic head part and the second magnetic head part, the slider being provided with a central groove that produces a first air bearing surface provided with the first magnetic head part and a second air bearing surface provided with the second magnetic head part, so that an elevating force is produced due to an air flow between the first and second air bearing surfaces and one of the first flexible medium and the second flexible medium in rotation, wherein given that, in a direction perpendicular to a direction in which one of the first flexible medium and the second flexible medium moves, the central groove has a width B1 at a leading edge thereof facing the approaching medium, and a corresponding width B2 at a trailing edge thereof facing the medium leaving the magnetic head, the width B2 at the trailing edge is set to be larger than the width B1 at the leading edge (B1<B2).

The above-described aspect of the invention provides the following advantages.

By setting the width B1, in a direction perpendicular to the direction in which the medium moves, of the central groove at the trailing edge thereof to be smaller than the width B2 at the leading edge (B1<B2), contact between the leading edge of the slider and the medium is prevented and the first magnetic head part is brought to close proximity to the medium.

The elevating force produced between the first air bearing surface and the medium is related to a width of the central groove such that the smaller the width of the central groove, the larger the elevating force. Therefore, by setting the width B2 of the central groove at the trailing edge thereof to be larger than the width B1 at the leading edge (B1<B2), the elevating force produced between the first air bearing surface and the medium is larger at the leading edge than at the trailing edge.

With this construction, contact between the leading edge of the slider and the medium is prevented, and the first magnetic head part provided adjacent to the trailing edge (removed from the leading edge) is brought to close proximity to the medium.

At least one of the first air bearing surface and the second air bearing surface may be provided with an elevating force control slot extending in a direction perpendicular to the direction in which the medium moves.

According to this aspect of the invention, the following advantage is provided.

By forming the elevating force control slot in at least one of the first air bearing surface and the second air bearing surface so as to extend in a direction perpendicular to the direction in which a medium moves, the elevating force is reduced around the elevating force control slot since the air flow between the bearing surface and the medium escapes to the elevating force control slot. Accordingly, the elevating force over each bearing surface is controlled so that the slider is brought to close proximity to the medium at a desired location (for example, at a location of the magnetic head part).

The elevating force control slot may be provided in the first air bearing surface and the second air bearing surface such that the elevating force control slots formed in the first air bearing surface and the second air bearing surface have an identical width in a direction in which the medium moves.

According to this aspect of the invention, the following advantage is provided.

By forming the elevating force control slot in the first and second air bearing surfaces and by controlling the width, in a direction of the movement of a medium, of the elevating force control slots formed in the first and second bearing surfaces to be identical to each other, reduction in the elevating force produced over the first bearing surface is controlled to be identical to that of the second bearing surface. In this way, the rotation of the medium is stabilized.

Given that the central groove has a depth C1 and the elevating control slot has a depth C2, the depth C2 may be set to be smaller than the depth C1 (C1>C2).

Given that, in a direction in which the medium moves, the central groove has a width D1 and the second air bearing surface has a width A3, the width D1 may be set to be smaller than the width A2 and the width A3 (A2>D1, A3>D1).

According to these aspects of the invention, the following advantage is provided.

By setting the depth C2 of the elevating force control slot to be smaller than the depth C1 of the central groove (C1>C2), and by setting the width D1, in the direction of the movement of the medium, of the elevating force control slot to be smaller than the width A2 of the first air bearing surface at the trailing edge and the width A3 of the second air bearing surface at the trailing edge, the elevating force is reduced around the elevating force control slot.

The elevating force control slot may be formed in a respective air bearing surface so as to be contiguous except at a location of a respective magnetic head part.

According to this aspect of the invention, the following advantage is provided.

By forming the elevating force control slot so as to be contiguous except at a location of the first magnetic head part or the second magnetic head part, the elevating force is reduced on both sides of the first magnetic head part or the second magnetic head part. With this, the medium is brought to close proximity to a gap in the associated magnetic head part.

The number of corners formed at a periphery of the slider may be controlled to be minimum.

According to this aspect of the invention, the following advantage is provided.

By controlling the number of corners formed at the periphery of the slider to be minimum, the slider and the medium are prevented from being damaged. It is to be noted that the corner of the slider is a location where a damage is most likely to occur when the slider is in contact with a medium. Thus, by reducing the number of corners, the slider and the medium are prevented from being damaged.

The aforementioned objects can also be achieved by a supporting structure for supporting a pair of opposite magnetic heads characterized by comprising the first and second magnetic heads, wherein the first air bearing surface of the first magnetic head is opposite to the second air bearing surface of the second magnetic head, and the second air bearing surface of the first magnetic head is opposite to the first air bearing surface of the second magnetic head, and in that a center of a width of the first air bearing surface is substantially aligned with a center of a width of the associated second air bearing surface.

According to the supporting structure of the invention, the following advantage is provided.

When the first and second magnetic heads are opposite to each other, the first air bearing surface of the first magnetic head is opposite to the second air bearing surface of the second magnetic head. The second air bearing surface of the first magnetic head is opposite to the first air bearing surface of the second magnetic head. The center of the width of the first air bearing surface is aligned with the center of the width of the associated second air bearing surface. With this construction, the elevating force produced over each bearing surface is properly exerted on a medium. Accordingly, the rotation of the medium is stabilized.

BRIEF DESCRIPTION OF THE DRAWINGS

Other objects and further features of the present invention will be apparent from the following detailed description when read in conjunction with the accompanying drawings, in which:

FIG. 14 is a top view showing the magnetic head according to the fourth embodiment;

FIG. 15 a top view showing the magnetic head according to the fifth embodiment;

DETAILED DESCRIPTION OF THE PREFERRED EMBODIMENTS

Figure 1:
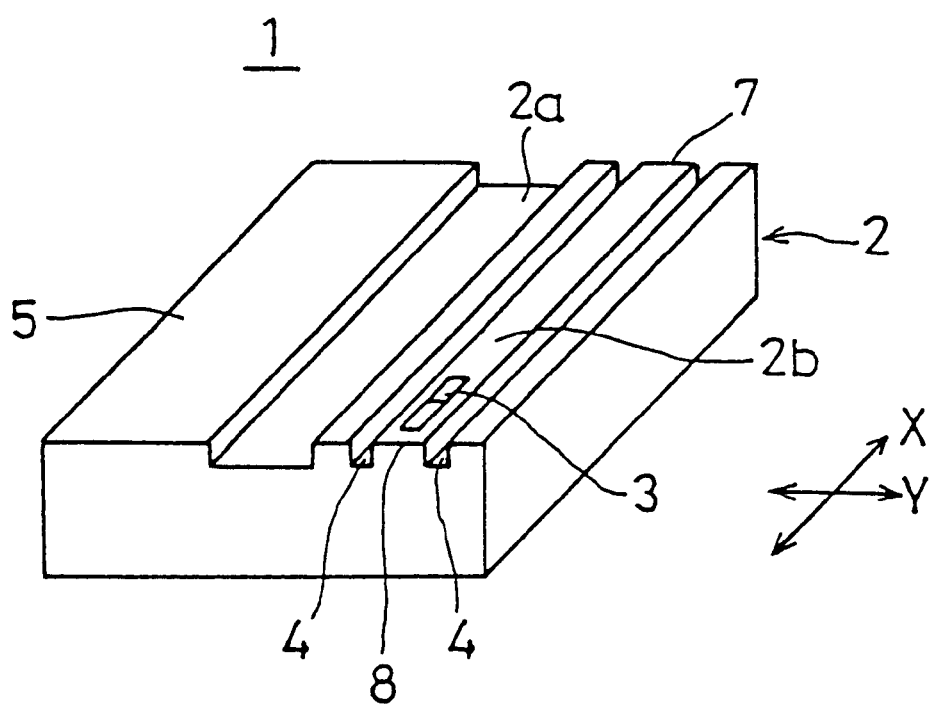
FIG. 1 is a perspective view showing the magnetic head according to the related art.
Figure 2:
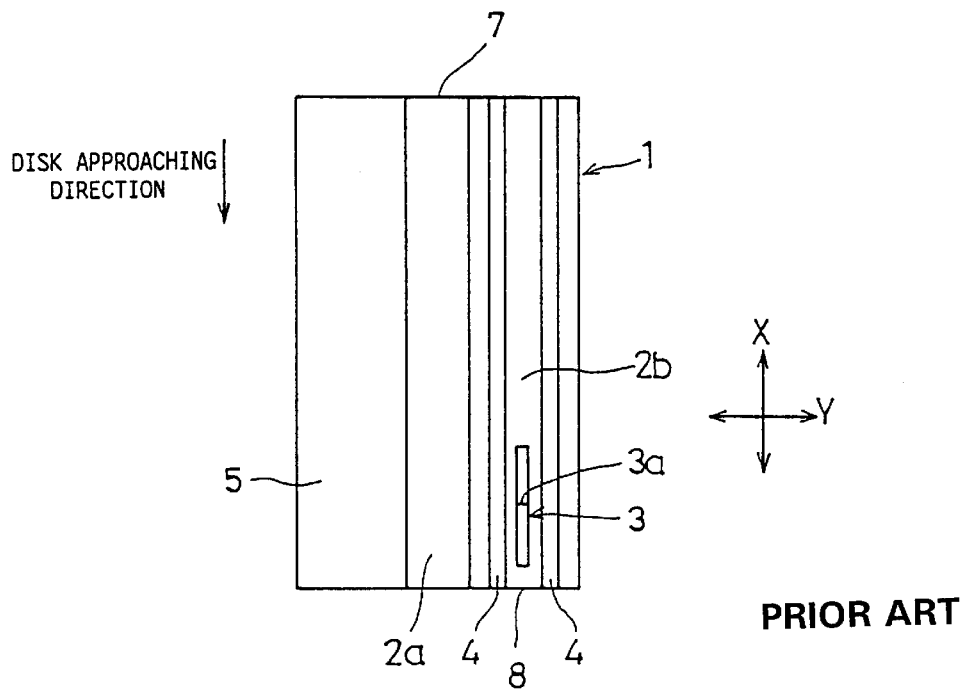
FIG. 2 is a top view showing the magnetic head according to the related art.
Figure 3:
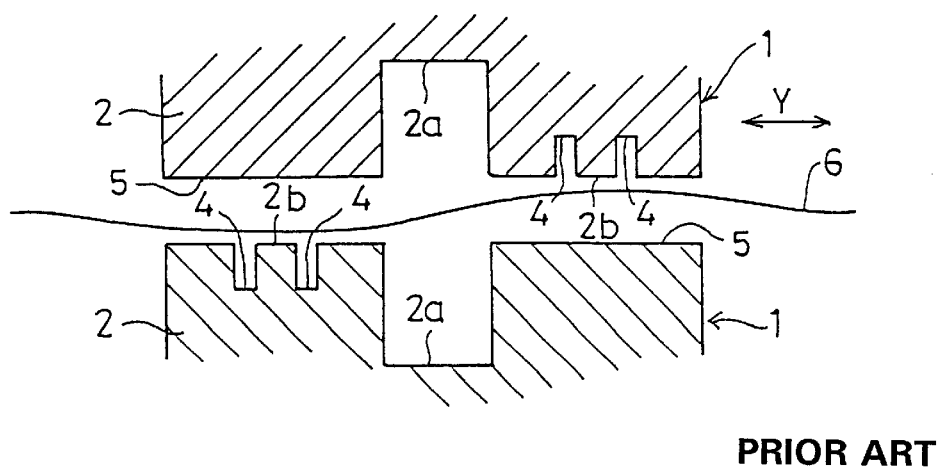
FIG. 3 is a lateral sectional view taken from a position of disk insertion.
Figure 4:
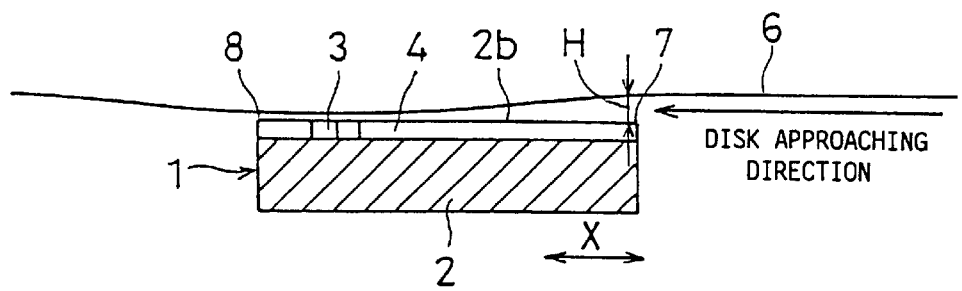
FIG. 4 is a lateral sectional view showing how the magnetic disk approaches the magnetic head according to the related art, taken in a radial direction (Y direction) of the magnetic disk.
Figure 5:
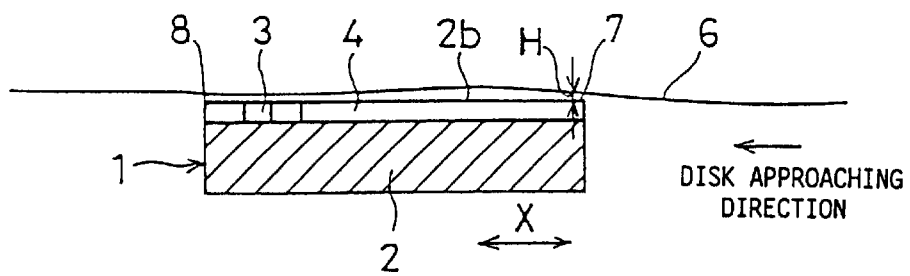
FIG. 5 is a lateral sectional view showing a state where the magnetic disk approaching the magnetic head according to the related art in a low profile.
Figure 6:
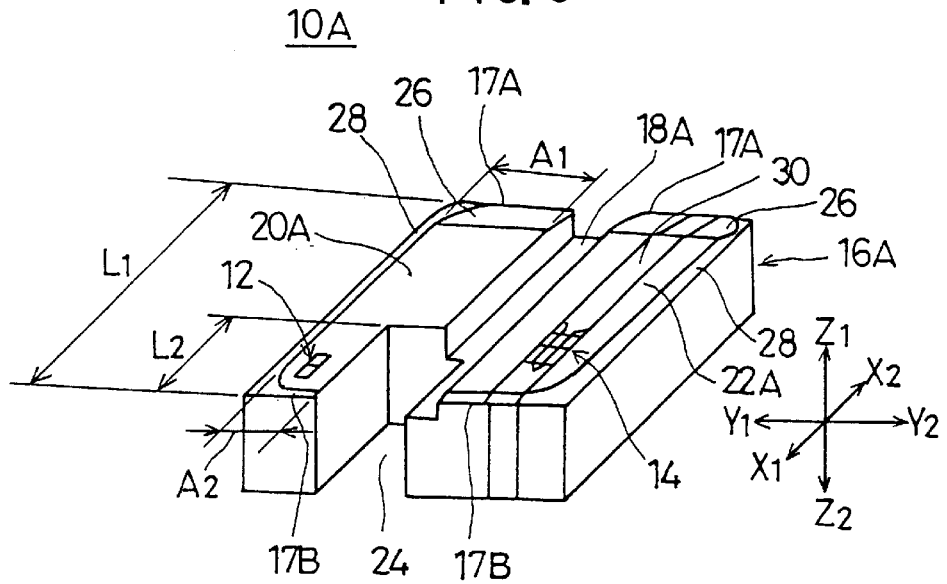
FIG. 6 is a perspective view of the magnetic head according to the first embodiment.
Figure 7:
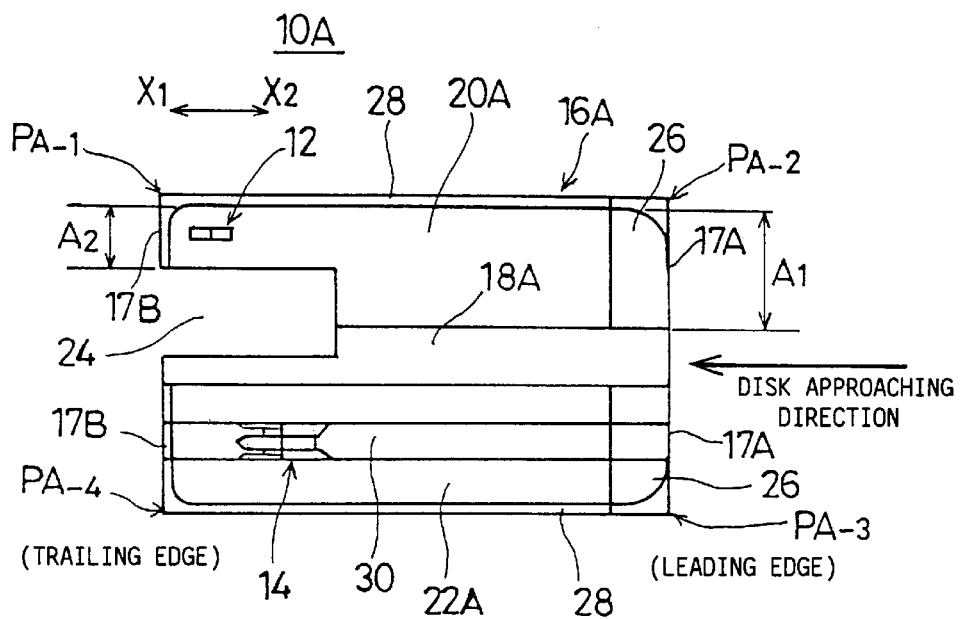
FIG. 7 is a top view of the magnetic head according to the first embodiment.

FIGS. 6 and 7 show a magnetic head 10A according to a first embodiment of the present invention. FIG. 6 is a perspective view of the magnetic head 10A, and FIG. 7 is top view of the magnetic head 10A. The magnetic head 10A generally comprises a first magnetic head part 12, a second magnetic head part 14 and a slider 16A.

The first magnetic head part 12 is provided on an air bearing surface 20A formed in the slider 16A, and the second magnetic head part 14 is provided on an air bearing surface 22A formed in the slider 16A. The first magnetic head part 12 is a provided for large-capacity magnetic reading and writing and is adapted for a magnetic disk having a coercive force exceeding 1500 Oe.

The second magnetic head part 14 is provided for ordinary magnetic reading and writing. For example, the second magnetic head part 14 is adapted for a magnetic disk having a coercive force on the order of 600–700 Oe. The second magnetic head part 14 is constructed such that a read/write gap (R/W gap) and an ease gap (E gap) are formed by sandwiching a gap member between magnetic head cores 30. With this construction, the magnetic head 10A according to the first embodiment is compatible with ordinary magnetic reading and writing, and with large-capacity magnetic reading and writing.

The slider 16A is a block member formed, for example, of a ceramic. The slider 16A supports the first and second magnetic head parts 12 and 14, and also provides a force for elevating the first magnetic head parts 12 and 14 over a magnetic disk 32. The slider 16A is provided with a central groove 18A, a first air bearing surface 20A, a second air bearing surface 22A, an incision 24, a slanting surface 26 and a chamfered part 28.

The central groove 18A is formed at the center of the width of the upper surface of the slider 16A (the center of the width in the Y1-Y2 direction) so as to extend in the direction of travel of the magnetic disk 32 (in the X direction shown in FIG. 6). By forming the central groove 18A, the first and second air bearing surfaces 20A and 22A are formed to sandwich the central groove 18A of the slider 16A.

In order for the magnetic head 10A to properly float over the magnetic disk 32, the air flow produced between the slider 16A and the magnetic disk 32 is smooth. For this purpose, the first and second air bearing surfaces 20A and 22A are formed as highly flat surfaces.

Figure 9:
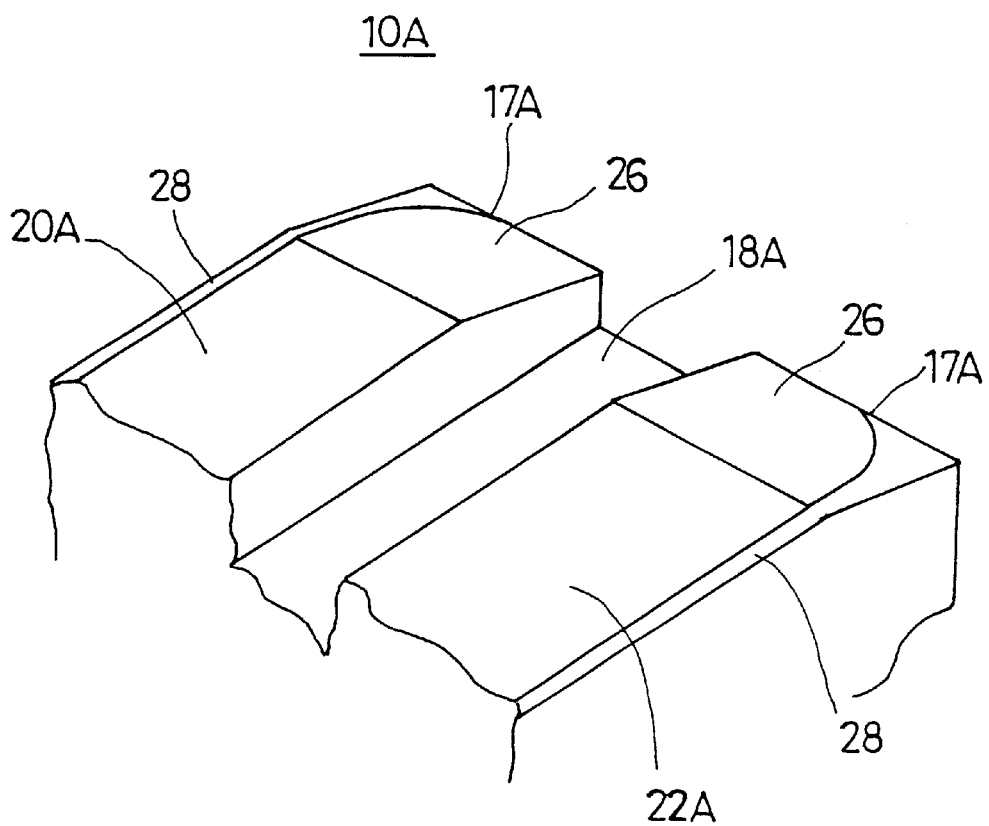
FIG. 9 is an enlarged view of the slanting surface provided in the magnetic head according to the first embodiment.

As shown in an enlarged view of FIG. 9, the leading edge of the slider 16A (the X2 edge facing the approaching magnetic disk 32) is provided with the slanting surface 26. The slanting surface 26 forms an angle of, for example, 60 minutes or below with respect to the first and second air bearing surfaces 20A and 22A. By forming the slanting surface 26 in the leading edge of the slider 16A facing the approaching magnetic disk 32, the magnetic disk 32 is prevented from colliding hard against the slider 16A.

In the following description, the X1 edge of the slider 16A facing the leaving magnetic disk 32 will be referred to as a trailing edge 17B and the X2 edge of the slider 16A facing the approaching magnetic disk 32 will be referred to as a leading edge 17A.

The periphery of the first and second air bearing surfaces 20A and 22A is provided with the chamfered part 28. Provision of the chamfered part 28 also prevents the magnetic disk 32 from colliding hard against the slider 16A when the magnetic head 10A is in a floating state.

The slider 16A in a floating state with respect to the magnetic disk 32 affects the magnetic disk 32 such that a movement such as rolling, yawing, pitching and the like occurs depending on the condition of the air flow between the slider 16A and the magnetic disk 32. When the movement is hard, the periphery of the first and second air bearing surfaces 20A and 22A of the slider 16A may collide against the magnetic disk 32. Thus, by forming the chamfered part 28 at the periphery of the first and second air bearing surfaces 20A and 22A, the magnetic disk 32 is prevented from colliding hard against the slider 16A.

Figure 10:
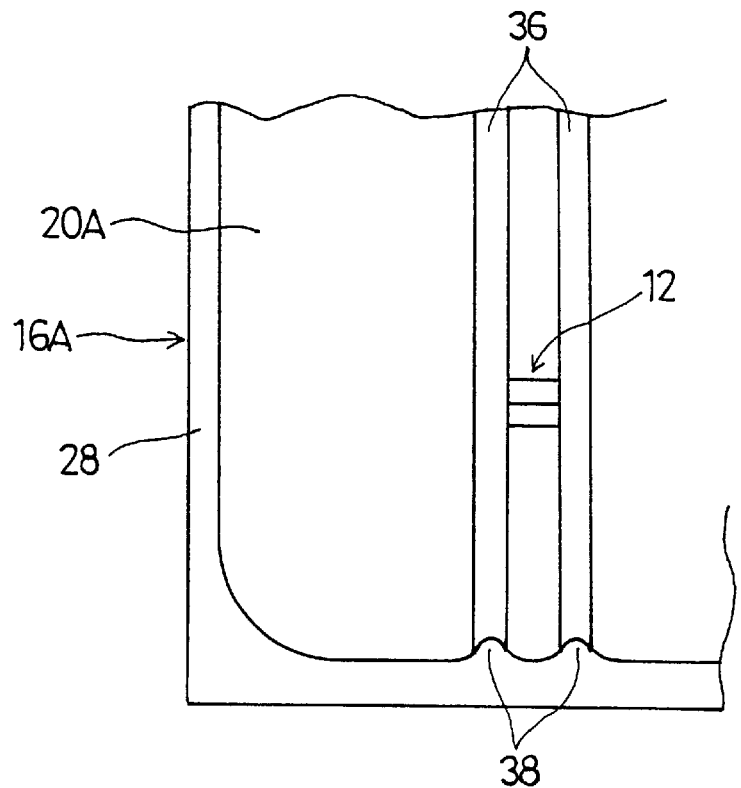
FIG. 10 is an enlarged view showing the neighborhood of the first magnetic head part.

FIG. 10 is an enlarged view showing how the first magnetic head part 12 is supported by the slider 16A. As shown in FIG. 10, glass layers 36 fix the first magnetic head part 12 to the slider 16A. In the first embodiment, the glass layers 36 are provided so as to sandwich the first magnetic head part 12 and extend to the trailing edge 17B of the slider 16A.

Since the glass layers 36 are softer than the ceramic slider 16A, provision of the chamfered part 28 at the periphery of the first and second air bearing surfaces 20A and 22A causes the glass layers 36 to be carved to a large degree at the chamfered part 28. Thus, the edge of the chamfered part 28 has a curved part 38 formed by carving of the glass layers 36.

When magnetic reading and writing is performed on the magnetic disk 32 using the magnetic head 10A, contact between the slider 16A and magnetic disk 32 takes place from time to time, causing magnetic powder to come off the magnetic disk 32. The magnetic powder coming off the magnetic disk 32 is known to pile up in a boundary between the slider 16A and the glass layers 36. By providing the glass layers 36 so as to extend to the trailing edge 17B and forming the curved part 38, the volume of magnetic powder piled up in the curved part 38 is properly controlled.

The magnetic powder piled up in the curved part 38 comes off the slider 16A in the form of clumps. Since the volume of magnetic powder piled up in the curved part 38 is small, the clumps of magnetic power coming off the slider 16A do not affect the magnetic reading and writing.

The X1 end of the central groove 18A formed in the slider 16A is provided with the incision 24 so as to penetrate the thickness of the slider 16A (Z1-Z2 direction shown in FIG. 6. The incision 24 is formed so as to control the width of the first air bearing surface 20A at the trailing edge 17B. Control of the width of the first air bearing surface 20A at the trailing edge 17B will be further described later.

The magnetic head 10A having the above-described construction floats over the magnetic disk 32 due to an elevating force produced by a change in the course of an air flow created by a relative speed between the first and second air bearing surfaces of the slider 16A and the magnetic disk 32. The magnetic head 10A performs magnetic reading and writing on the magnetic disk 32 while maintaining a non-contact state (see FIG. 8).

A description will now be given of the first air bearing surface 20A formed in the slider 16A of the magnetic head 10A.

As described above, the magnetic head 10A is provided with the incision 24A so as to penetrate the thickness of the slider 16A. By forming the incision 24 and by controlling the width thereof in the Y1-Y2 direction shown in FIG. 6, the width A2 of the first air bearing surface 20A at the trailing edge 17B can be controlled.

According to the first embodiment, the incision 24 is formed such that the width A2 of the first air bearing surface 20A at the trailing edge 17B is set to be smaller than the width A1 at the leading edge 17A (A1>A2). More specifically, the width A2 at the trailing edge 17B is equal to or smaller than half the width A1 at the leading edge 17A (A2 (A1/2)).

In the first embodiment, the length L2 of the incision 24 in the X1-X2 direction shown in FIG. 6 is set to be ⅓ of the length L1 of the slider 16A or larger (L2>(L1/3)).

By setting the width A1 of the first air bearing surface 20A at the leading edge 17A to be equal to or larger than the width A2 at the trailing edge 17B, and by setting the length L2 of the incision to be relatively large, contact between the leading edge 17A and the magnetic disk 32 is prevented. With this construction, the first magnetic head part 12 is maintained in proximity of the magnetic disk 32.

A description will be given of the background for the above-described advantages. The elevating force produced between the first air bearing surface and the magnetic disk 32 is related to the area of the first air bearing surface. It is to be noted that, since the elevating force is produced as a result of the air flow between the first air bearing surface and the magnetic disk 32, the larger the area of the first air bearing surface 20A, the larger the elevating force.

Accordingly, by controlling the width A2 of the first air bearing surface 20A at the trailing edge to be smaller than the width A1 at the leading edge (A1>A2), and by controlling the length L2 of the incision 24 to be relatively large, the area of the first air bearing surface at the trailing edge is smaller than the area at the leading edge. With this, the elevating force that occurs between the first air bearing surface 20A and the magnetic disk 32 at the leading edge is greater than the corresponding force at the trailing edge.

Figure 8:
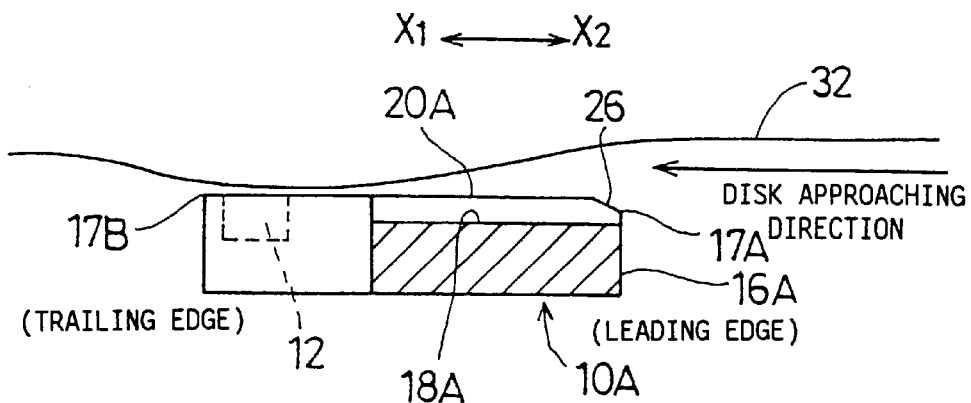
FIG. 8 is a a diagram showing a state of a magnetic disk when the magnetic head according to the first embodiment is used.

FIG. 8 is a side view showing how the magnetic head 10A is used to perform a magnetic reading and writing process on the magnetic disk 32. The magnetic disk 32 is flexible so that it can be deformed by the elevating force described above.

Thus, when the magnetic head 10A of the first embodiment is used, the elevating force that occurs between the first air bearing surface 20A and the magnetic disk 32 is greater at the leading edge than at the trailing edge so that, as shown in FIG. 8, the first air bearing surface is at some distance from the magnetic disk 32 at the leading edge, and the first air bearing surface is at close proximity to the magnetic disk 32 at the trailing edge.

By ensuring that the first air bearing surface 20A is at some distance from the magnetic disk 32 at the leading edge, the leading edge 17A is prevented from coming into contact with the magnetic disk 32 even when the magnetic disk 32 approaches the magnetic head 10A with a small clearance from the magnetic disk 32. This prevents the leading edge 17A and the magnetic disk 32 from being damaged as the magnetic disk 32 enters a space over the leading edge 17A.

Since the elevating force is relatively small at the first magnetic head part 12 provided adjacent to the trailing edge, it is ensured that the first magnetic head part 12 is at close proximity to the magnetic disk 32.

By ensuring that the first magnetic head part 12 is at close proximity to the magnetic disk 32, the magnetic force generated by the first magnetic head part 12 is properly applied to the magnetic disk 32 so that a write operation is properly performed. In a read operation, the magnetic field created by the magnetic disk 32 is properly applied to the first magnetic head part 12 so that a read signal of a sufficient intensity is obtained. Thus, the first magnetic head part 12 at the trailing edge can properly perform a magnetic reading and writing process on the magnetic disk 32.

Figure 11:
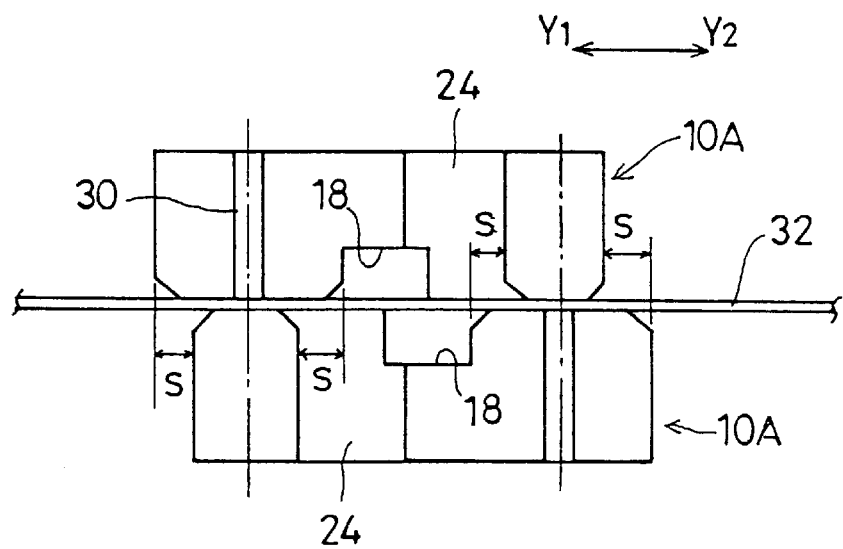
FIG. 11 is a diagram showing the magnetic head supporting structure according to an embodiment of the present invention.

FIG. 11 shows a supporting structure for supporting the magnetic head 10A according to the first embodiment at a predetermined location in a magnetic disk device.

As is well known, the magnetic disk 32 used recently has both sides thereof formed as a magnetic recording area. Therefore, the pair of magnetic heads 10A are provided opposite to each other sandwiching the magnetic disk 32.

The supporting structure for supporting the magnetic head 10A is constructed such that the first air bearing surface 20A of the upper magnetic head 10A is opposite to the second air bearing surface 22A of the lower magnetic head 10A, and the second air bearing surface 22A of the upper magnetic head 10A is opposite to the first air bearing surface 20A of the lower magnetic head 10A.

In this construction, the center of width of the first air bearing surface 20A is substantially aligned to the center of the width of the associated second air bearing surface 22A (the center line is indicated by the alternate long and short dash line shown in FIG. 11). With this construction, a space S is created between the side edge of the first air bearing surface 20A (the side edge at the Y1-Y2 extreme of the first air bearing surface 20A as shown in FIG. 11) and the associated side edge of second air bearing surface 22A.

When an ordinary magnetic disk having a coercive force of 900 Oe or below is used as the magnetic disk 32, the above-described construction ensures that sliding contact between the pair of magnetic heads 10A and the magnetic disk 32 is stabilized. When a high-capacity magnetic disk having a coercive force of 1500 Oe or greater is used as the magnetic disk 32, the elevating force produced by the first and second bearing surfaces 20A and 22A is applied to the magnetic disk 32 in a balanced manner. With the supporting structure described above, it is ensured that the magnetic disk 32 travels properly with respect to the magnetic disk 10A in an ordinary magnetic reading and writing process and a high-capacity magnetic reading and writing process.

A description will now be given of a second embodiment of the present invention.

Figure 12:
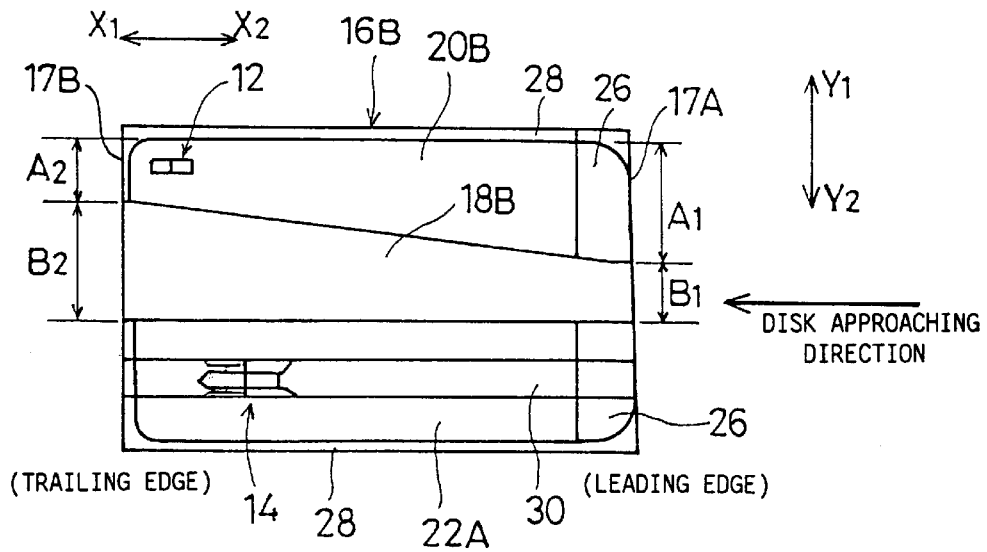
FIG. 12 is a top view showing the magnetic head according to the second embodiment.

FIG. 12 shows a magnetic head 10B according to the second embodiment of the present invention. In FIG. 12, those components that are identical to the corresponding components of the magnetic head 10A described with reference to FIGS. 6 through 11 are designated by the same reference numerals, and the description thereof is omitted. The same procedure is applied to the subsequent embodiments (third through twelfth embodiments).

The magnetic head 10A of the first embodiment is constructed such that the width A2 of the first air bearing surface at the trailing edge is controlled to be smaller than the width A1 at the leading edge by forming the incision 24.

In contrast to this, the magnetic head 10B of the second embodiment is constructed such that the width of a central groove 18B of the magnetic head 10B is varied along the longitude thereof (X1-X2 direction shown in FIG. 12) so that the width A2 of the first air bearing surface 20A at the trailing edge 17B is controlled to be smaller than the width A1 at the leading edge 17A.

More specifically, the central groove 18B is configured to be gradually wider toward the trailing edge 17B so that the width B1 at the leading edge 17A in a direction perpendicular to the direction in which the medium moves (Y1-Y2 direction shown in FIG. 12) is controlled to be smaller than the width B2 at the trailing edge 17B (B1<B2). With this construction, the width of a first air bearing surface 20B of the magnetic head 10B gradually increases toward the trailing edge 17B (in the X1 direction) so that, similar to the first embodiment, the width A2 at the trailing edge 17B is smaller than the width A1 at the leading edge 17A (A1>A2).

By setting the width B2 at the trailing edge 17B of the central groove 18B to be larger than the width B1 at the leading edge 17A (B1<B2), the leading edge 17A of a slider 16B of the magnetic head 10B is prevented from coming into contact with the magnetic disk 32. It is also ensured that the first magnetic head part 12 is at close proximity to the magnetic disk 32.

A description will be given of the background for the above-described advantages. The elevating force produced between the first air bearing surface 20B and the magnetic disk 32 is related to the width of the central groove 18B such that the smaller the width, the larger the elevating force. Accordingly, by setting the width B2 of the central groove 18B at the trailing edge to be larger than the width B1 at the leading edge (B1<B2), the elevating force created between the first air bearing surface 20B and the magnetic disk 32 is larger at the leading edge than at the trailing edge.

Like the first embodiment, the second embodiment prevents the leading edge 17A of the slider 16*b* from coming into contact with the magnetic disk 32 so that the slider 16B and the magnetic disk 32 are prevented from being damaged. Since it is ensured that the magnetic head part 12 provided away from the leading edge 17A and adjacent to the trailing edge is at close proximity to the magnetic disk 32, the magnetic head part 12 can properly perform a magnetic reading and writing process.

The magnetic head 10B according to the second embodiment is also constructed such that the width A2 of the first air bearing surface 20B at the trailing edge is smaller than the width A1 at the leading edge (A1>A2). This construction also prevents the slider 16B and the magnetic disk 32 from being damaged and ensures proper magnetic reading and writing processing.

A description will now be given, with reference to FIGS. 13 through 16, of third through sixth embodiments of the present invention.

Like the magnetic head 10A of the first embodiment and the magnetic head 10B of the second embodiment, magnetic heads 10C–10F according to the third through sixth embodiments of the present invention are constructed to ensure that the slider (16C–16F) and the magnetic disk 32 are prevented from being damaged by controlling the width A2 at the trailing edge of the first air bearing surface (20C–20F) to be smaller than the width A1 at the leading edge (A1>A2), or by controlling the width B2 of the central groove (18C, 18D) at the trailing edge to be larger than the width B1 at the leading edge (B1<B2). In this way, proper magnetic reading and writing can be performed.

Figure 13:
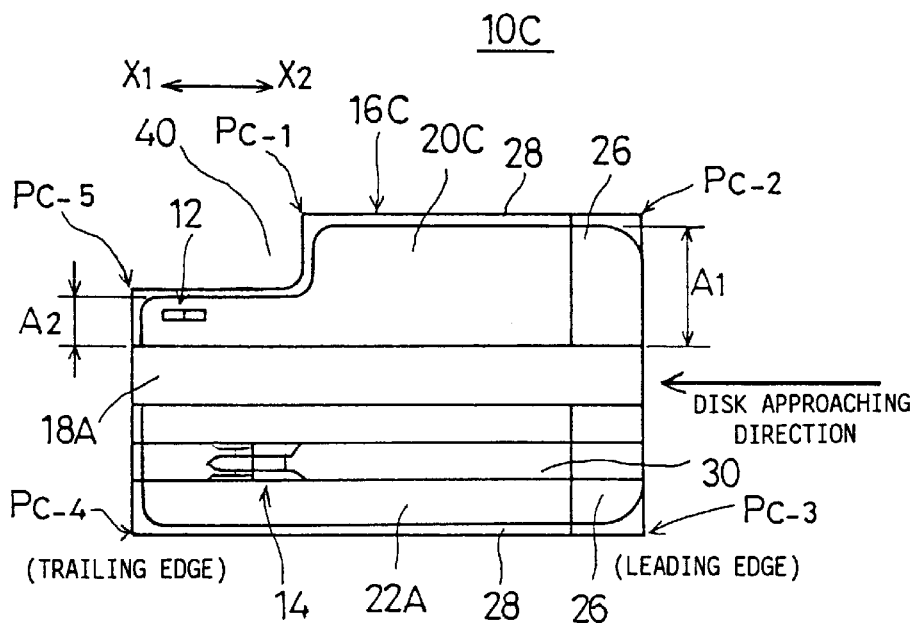
FIG. 13 is a top view showing the magnetic head according to the third embodiment.

FIG. 13 shows a magnetic head 10C according to the third embodiment. The magnetic head 10C is constructed such that the width A2 of a first air bearing surface 20C at the trailing edge is smaller than the width A1 at the leading edge (A1>A2) by forming a recess 40 at the periphery of a slider 16C at the trailing edge.

With this construction, the slider 16C and the magnetic disk 32 are prevented from being damaged so that proper magnetic reading and writing can be performed. It is to be noted that forming the recess 40 having a rectangular configuration at the periphery of the slider 16C produces five corner portions PC-1–PC-5 at the periphery of the slider 16C. As shown in FIG. 7, the construction of the first embodiment wherein the incision 24 is formed produces four corner portions PA-1–PA-4 at the periphery of the slider 16A.

The corner portions formed in the slider are locations most likely damaged by the magnetic disk 32 when a contact occurs. Therefore, by reducing the number of corner portions, it is possible to prevent damaged to the slider and the magnetic disk 32. The construction of the magnetic head 10A of the first embodiment is more effective than the construction of the magnetic head 10C in reducing the number of locations that potentially incur damage.

In forming a recess in the slider so as to control the width A2 of the first air bearing surface at the trailing edge is smaller than the width A1 at the leading edge (A1>A2), it is important that the number of corner portions formed at the periphery of the slider is minimum. Such an arrangement helps prevent damage from occurring in the slider and the medium.

FIG. 14 shows a magnetic head 10D according to a fourth embodiment of the present invention. The magnetic head 10D is constructed such that the width A2 of a first air bearing surface 20D at the trailing edge is controlled to be smaller than the width A1 at the leading edge (A1>A2) by forming the first air bearing surface 20D in a slider 16D as a substantially T-shape configuration in a top view.

FIG. 15 shows a magnetic head 10E according to the fifth embodiment. The magnetic head 10E is constructed such that the width A2 of a first air bearing surface 20E at the trailing edge is controlled to be smaller than the width A1 at the leading edge (A1>A2) by reducing the width of (narrowing) the first air bearing surface 20E near the trailing edge formed in a slider 16E. The construction of the fifth embodiment has a benefit of controlling the width B2 of a central groove 18D at the trailing edge to be larger than the width B1 at the leading edge.

Figure 16:
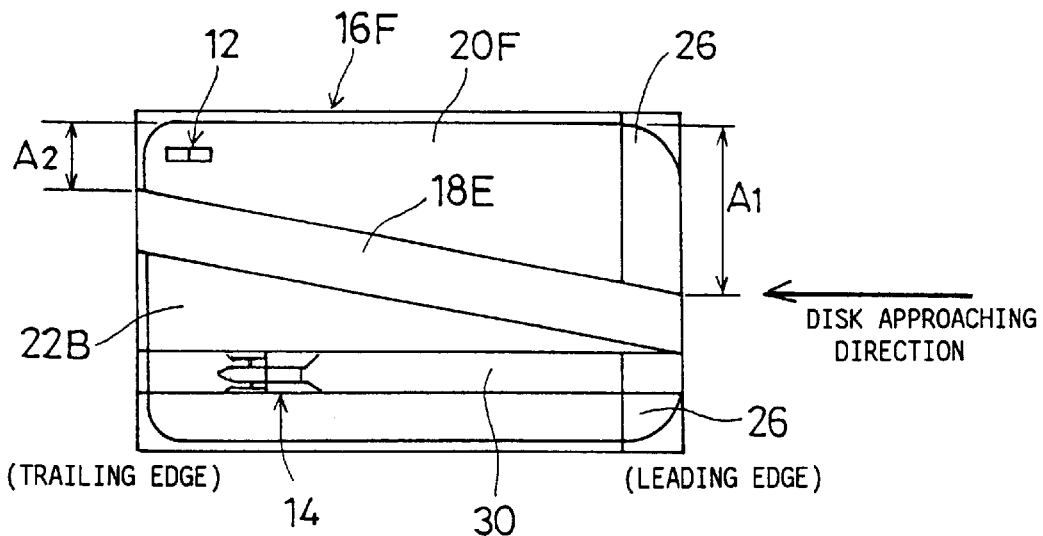
FIG. 16 is a top view showing the magnetic head according to the sixth embodiment.

FIG. 16 shows a magnetic head 10F according to the sixth embodiment of the present invention. The magnetic head 10F is constructed such that the width A2 of a first air bearing surface 20F at the trailing edge is controlled to be smaller than the width A1 at the leading edge (A1>A2) by forming a central groove 16F so as to extend diagonally in a slider 18F.

A description will now be given of a seventh embodiment of the present invention.

Figure 17:
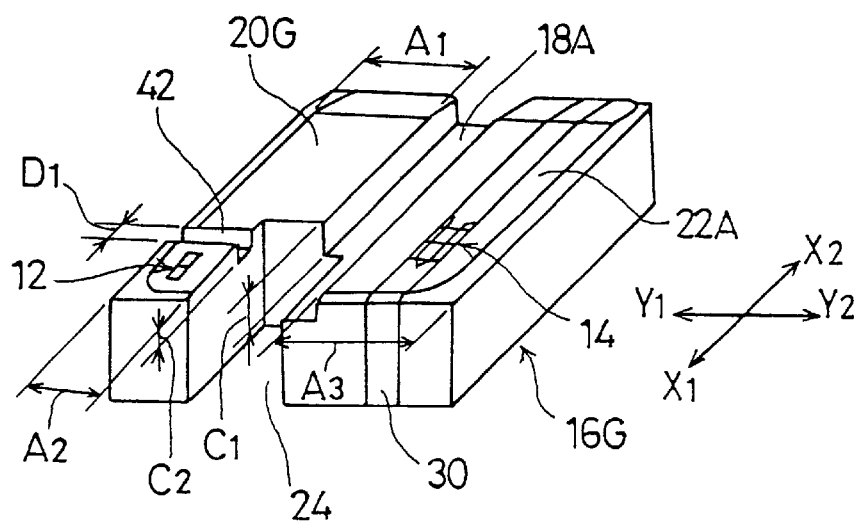
FIG. 17 a perspective view showing the magnetic head according to the seventh embodiment.
Figure 18:
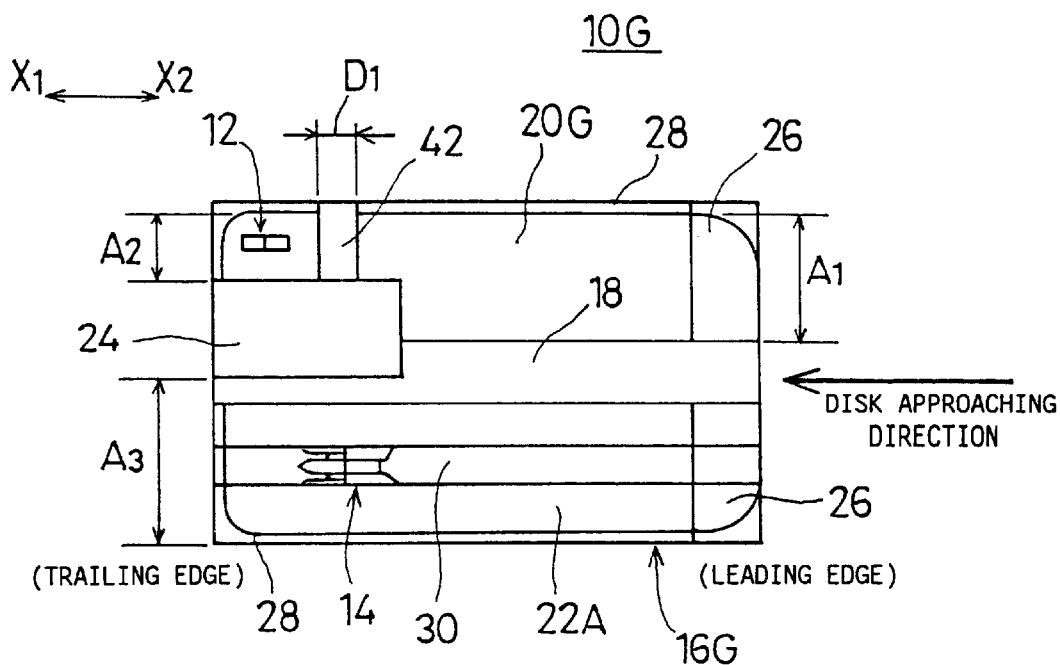
FIG. 18 a top view showing the magnetic head according to the seventh embodiment.

FIGS. 17 and 18 show a magnetic head 10G according to the seventh embodiment. FIG. 17 is a perspective view of the magnetic head 10G and FIG. 18 is a top view of the magnetic head 10G.

The magnetic head 10G is constructed such that an elevating force control slot 42 is formed in a first air bearing surface 20G so as to extend in a direction perpendicular to the direction (Y1-Y2 direction shown in FIG. 17) in which the magnetic disk 32 moves. The elevating force control slot 42 is formed to be adjacent to the first magnetic head part 12.

The depth C2 of the elevating force control slot 42 is set to be smaller than the depth C1 of the central groove 18A (C1>C2). Further, the width D1 of the elevating force control slot 42 in the direction of the movement of the medium (X1 direction shown in FIG. 17) is smaller than the trailing-edge width A2 of the first air bearing surface 20G (A2>D1). The trailing-edge width A2 is smaller than the trailing-edge width A3 of the second air bearing surface 22A.

Since the elevating force control slot 42 is formed to be adjacent to the first magnetic head part 12 of the first air bearing surface 20G, the elevating force around the first magnetic head part 12 is reduced.

That is, the elevating force control slot 42 provides a vent to the air flow between the first air bearing surface 20G and the magnetic disk 32 so that the air flow escapes from a space between the first air bearing surface 20G and the magnetic disk 32. With this, the elevating force around the elevating force control slot 42 is reduced. Accordingly, by appropriately selecting the location of the elevating force control slot 42 in the first air bearing surface 20G, the elevating force on the first air bearing surface 20G is appropriately controlled.

In the seventh embodiment, the elevating force control slot 42 is provided to be adjacent to the first magnetic head part 12. With this construction, the elevating force around the first magnetic head part 12 is reduced so that the first magnetic head part 12 is brought to close proximity to the magnetic disk 32, thus ensuring that magnetic reading and writing is properly performed.

A description will now be given of an eighth embodiment of the present invention.

Figure 19:
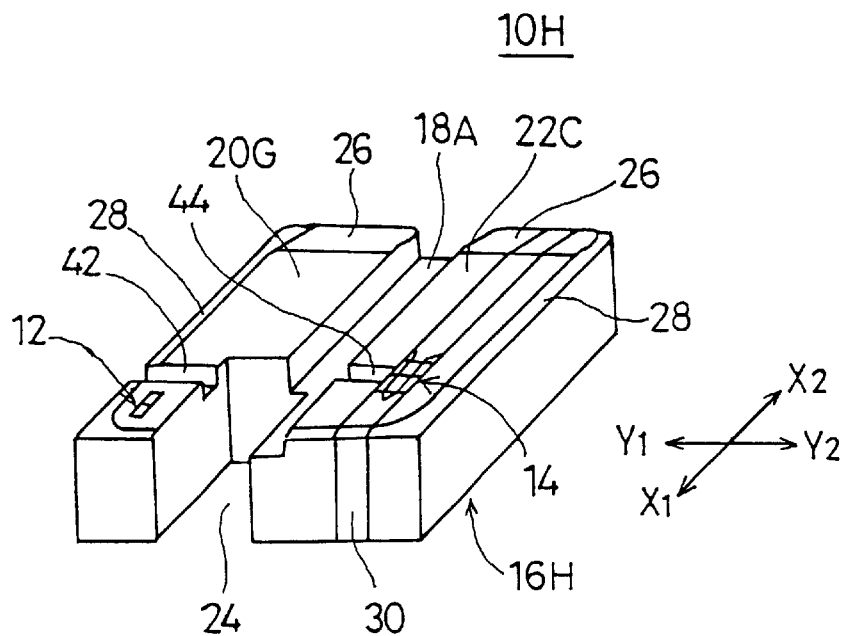
FIG. 19 is a perspective view showing the magnetic head according to the eighth embodiment.
Figure 20A:
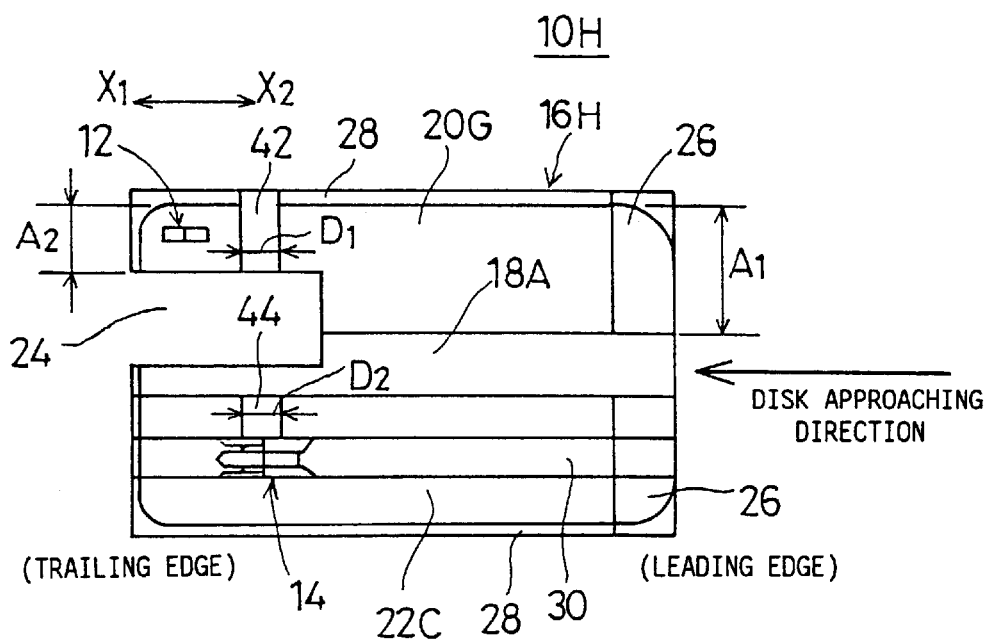
FIG. 20A is a top view showing the magnetic head according to the eighth embodiment.
Figure 20B:
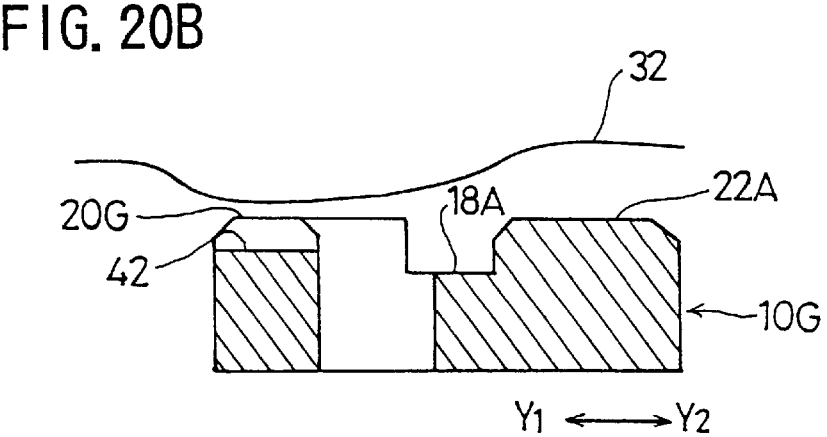
FIG. 20B is a sectional view of the magnetic head according to the seventh embodiment.

FIGS. 19, 20A, 20B and 20C show a magnetic head 10H according to the eighth embodiment. FIG. 19 is a perspective view showing the magnetic head 10H, FIG. 20A is a top view of the magnetic head 10H and FIGS. 20B and 15C show a behavior of the magnetic disk 32 in a magnetic reading and writing process. In FIGS. 19, 20A, 20B and 20C, those components that are identical to the corresponding components of the magnetic head 10G of the seventh embodiment are designated by the same reference numerals and the description thereof is omitted.

Like the magnetic head 10G of the seventh embodiment, the magnetic head 10H according to the eighth embodiment is also constructed such that the elevating force control slot 42 (first elevating force control slot 42) is formed in the first air bearing surface 20G. The magnetic head 10H is further provided with a second elevating force control slot 44 on a second air bearing surface 22C. The second elevating force control slot 44 is formed to be adjacent to the side of the second magnetic head part 14. Thus, an elevating force control slot may be formed on the second air bearing surface 22C as well as on the first air bearing surface 20G.

By forming the first elevating force control slot 42 on the first air bearing surface 20G and forming the elevating force control slot 44 on the second air bearing surface 22C, variation in deformation of the magnetic disk 32 in a radial direction (Y1-Y2 direction shown in FIG. 19) is reduced. A description on this will be given with reference to FIGS. 20B and 20C.

Figure 20C:
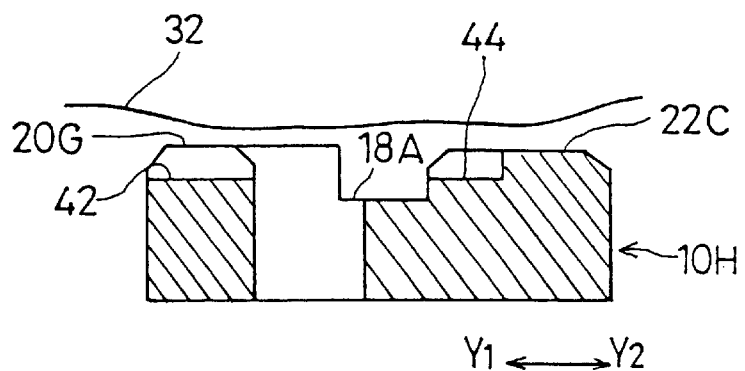
FIG. 20C is a sectional view of the magnetic head according to the eighth embodiment.

FIG. 20B shows a behavior of the magnetic disk 32 while a magnetic reading and writing process is being performed using the magnetic head 10G according to the seventh embodiment, and FIG. 20C shows a behavior of the magnetic disk 32 while a magnetic reading and writing process is being performed using the magnetic head 10H according to the eighth embodiment. FIGS. 205B and 20C are sectional views of the magnetic head 10G and the magnetic head 10H, taken along a line that traverses the first elevating force slot 42.

As shown in FIG. 20B, the magnetic head 10H according to the seventh embodiment is only provided with the first elevating force control slot 42 so that reduction in the elevating force occurs only at the first elevating force control slot 42. Therefore, the magnetic disk 32 is at close proximity to the magnetic head 10G above the first air bearing surface 20G.

However, since an elevating force control slot is not formed on the second air bearing surface 22A, a relatively large elevating force is exerted on the magnetic disk 32 above the second air bearing surface 22A. For this reason, the magnetic disk 32 is at some distance from the magnetic head 10G over the second air bearing surface 22A.

As a result, the flexible magnetic disk 32 is deformed to a significant degree as shown in FIG. 20B, causing the rotation to be less stable. In an ordinary magnetic reading and writing process using an ordinary magnetic disk, the magnetic disk 32 comes into sliding contact with the second air bearing surface 22A so that the second magnetic head part 14 is used for magnetic reading and writing. Due to the rotation of the magnetic disk 32, an elevating force smaller than the elevating force that occurs in high-capacity magnetic reading and writing process is produced in the ordinary magnetic reading and writing process.

Accordingly, in a construction in which an elevating force control slot is not formed on the second air bearing surface 22A, an ordinary magnetic disk (the magnetic disk 32) flies relatively high above the second air bearing surface 22A. This may create an undesirably large distance between the second magnetic head part 14 and the magnetic disk 32, preventing a magnetic reading and writing process from being properly performed.

By forming the first elevating force control slot 42 on the first air bearing surface 20G and forming the second elevating force control slot 44 on the second air bearing surface 22C as is done in the magnetic head 10H of the eighth embodiment shown in FIG. 20C, the elevating force is reduced not only over the first air bearing surface 20G but also over the second air bearing surface 22C. Accordingly, the magnetic disk 32 is controlled to be substantially parallel with the first and second air bearing surfaces 20G and 22C of the magnetic head 10H.

With this, the stability of the rotation of the magnetic disk 32 is improved. Since the elevating force produced over the second air bearing surface 22C in an ordinary magnetic reading and writing process is relatively small, the above-described construction ensures that the magnetic disk 32 is in a sliding contact with the second magnetic head part 14 so that magnetic reading and writing can be properly performed.

The magnetic head 10H according to the eighth embodiment is constructed such that the width D1 (dimension in the X1-X2 direction shown in FIG. 20A) of the first elevating force control slot 42 formed in the first air bearing surface 20G and the width D2 of the second elevating force control slot 44 formed in the second air bearing surface 22C are substantially equal to each other (D1 D2). With this construction, reduction in the elevating force occurring above the first air bearing surface 20G and reduction over the second air bearing surface 22C are controlled to be substantially equal to each other. Such a configuration also helps to stabilize the rotation of the magnetic disk 32.

A description will now be given of a ninth embodiment of the present invention.

Figure 21:
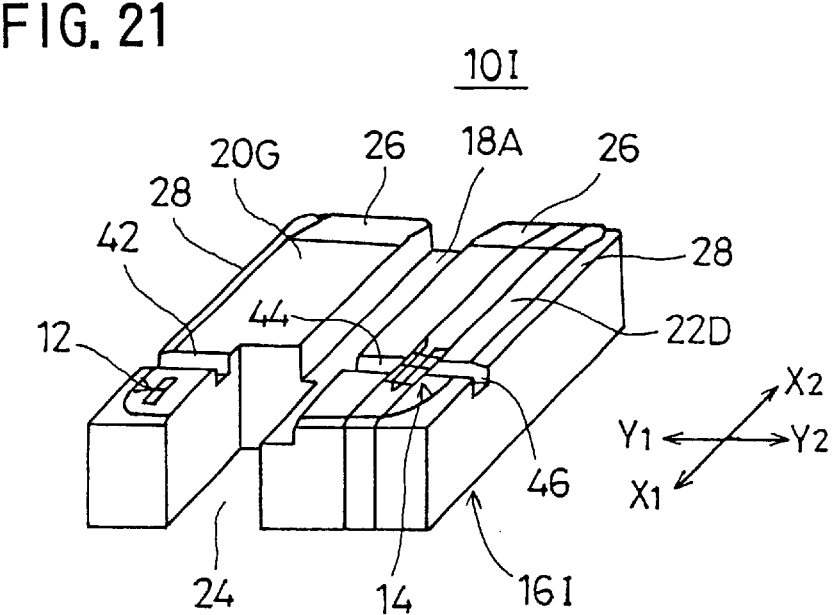
FIG. 21 is a perspective view showing the magnetic head according to the ninth embodiment.
Figure 22:
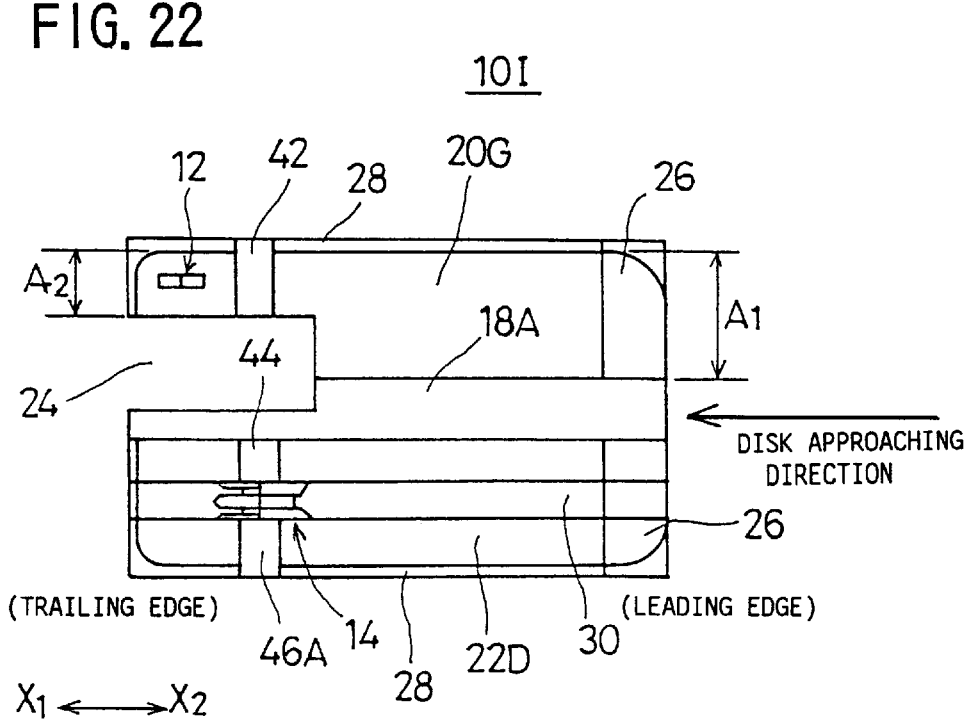
FIG. 22 a top view showing the magnetic head according to the ninth embodiment.

FIGS. 21 and 22 show a magnetic head 10I according to the ninth embodiment. FIG. 21 is a perspective view of the magnetic head 10I and FIG. 22 is a top view of the magnetic head 10I. In FIGS. 21 and 22, those components that are identical to the corresponding components of the magnetic head 10G shown in FIGS. 17 and 18, and of the magnetic head 10H shown in FIGS. 19, 20A, 20B and 20C are designated by the same numerals, and the description thereof is omitted.

The magnetic head 10I of the ninth embodiment is constructed such that the first elevating force control slot 42 is formed on the first air bearing surface 20G, the second elevating force control slot 44 and a third elevating force control slot 46A are formed on a second air bearing surface 22D. The second and third elevating force control slots 44 and 46A are formed to be adjacent to the side of the second magnetic head part 14 so as to sandwich the magnetic head core 30. That is, the second and third elevating force control slots 44 and 46A are contiguous with each other except at the second magnetic head part 14.

With this construction, the elevating force is reduced above the first and second magnetic head parts 12 and 14 so that the magnetic disk 32 is brought to close proximity to a gap over the magnetic head parts 12 and 14 maintaining a substantially parallel profile. Since the second and third elevating force control slots 44 and 46A are formed on the second air bearing surface 22D so as to sandwich the second magnetic head part 14, the elevating force is reduced on both sides of the second magnetic head part 14. This also helps to bring the magnetic disk 32 to close proximity to a gap over the second magnetic head part 14.

A description will now be given of a tenth embodiment and an eleventh embodiment of the present invention.

Figure 23:
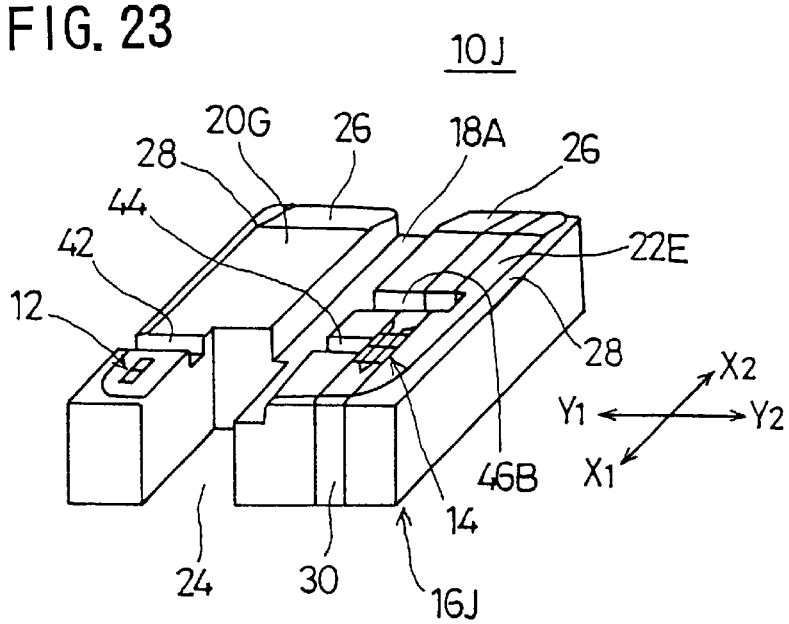
FIG. 23 a perspective view showing the magnetic head according to the tenth embodiment.
Figure 24:
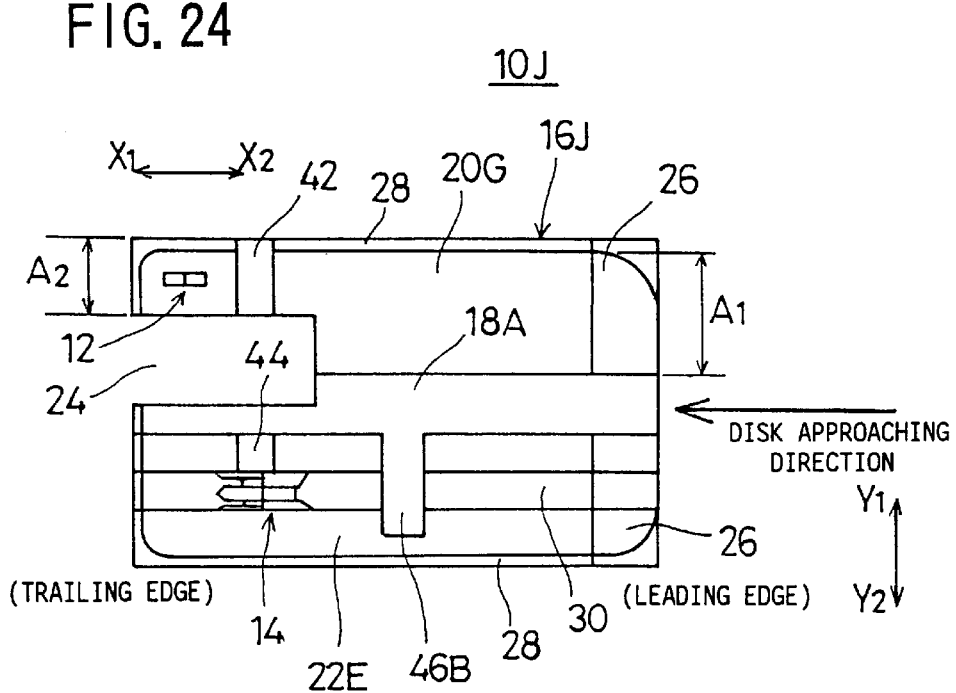
FIG. 24 is a top view showing the magnetic head according to the tenth embodiment.
Figure 25:
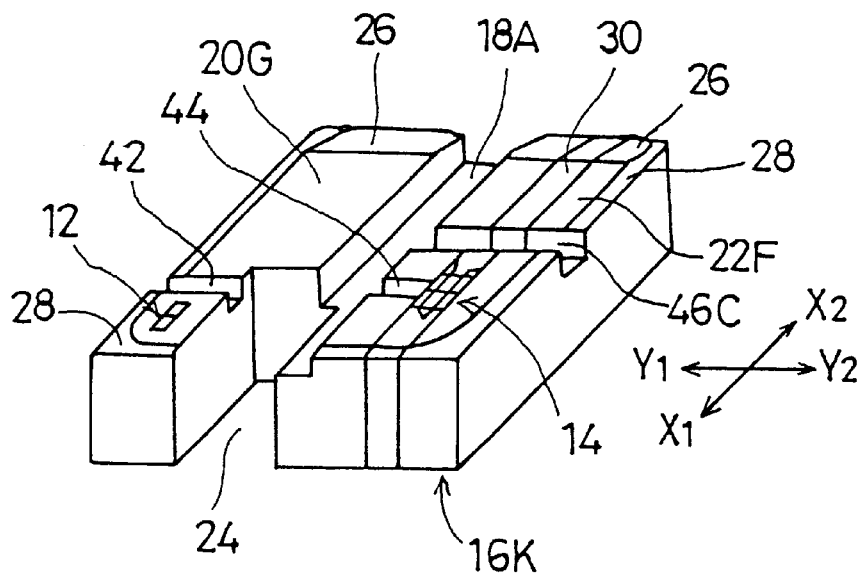
FIG. 25 is a perspective view showing the magnetic head according to the eleventh embodiment.
Figure 26:
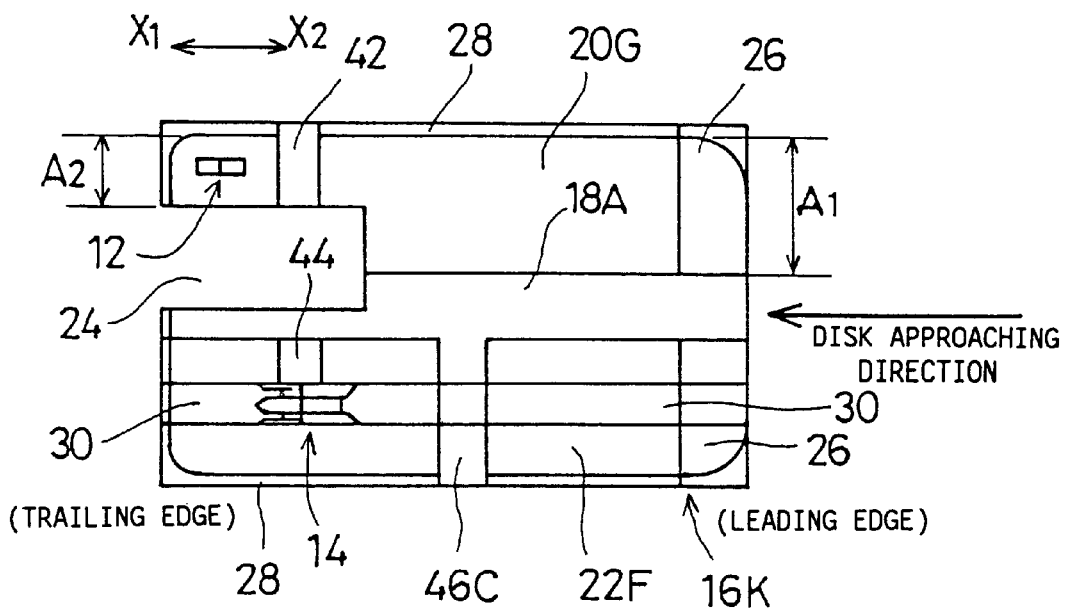
FIG. 26 is a top view showing the magnetic head according to the eleventh embodiment.

FIGS. 23 and 24 show a magnetic head 10J according to the tenth embodiment. FIGS. 25 and 26 show a magnetic head 10K according to the eleventh embodiment. FIG. 23 is a perspective view of the magnetic head 10J, and FIG. 24 is a top view of the magnetic head 10J. FIG. 25 is a perspective view of the magnetic head 10K, and FIG. 26 is a top view of the magnetic head 10K. In FIGS. 23 through 26, those components that are identical to the corresponding components of the magnetic head 10G shown in FIGS. 17 and 18, and of the magnetic head 10H shown in FIGS. 19, 20A, 20B and 20C are designated by the same reference numerals and the description thereof is omitted.

The magnetic head 10J according to the tenth embodiment is constructed such that the first elevating force control slot 42 is formed on the first air bearing surface 20G, the second elevating force control slot 44 is formed on a second air bearing surface 22E, and a third elevating force control unit 46B is formed on the second air bearing surface 22E at a location displaced in the X2 direction from the second magnetic head part 14. The magnetic head 10K according to the eleventh embodiment is constructed such that the first elevating force control slot 42 is formed on the first air bearing surface 20G, the second elevating force control slot 44 is formed on a second air bearing surface 22F, and a third elevating force control slot 46C is formed on the second air bearing surface 22F at a location displaced from the second magnetic head part 14.

In the magnetic head 10J of the tenth embodiment, the third elevating force control slot 46B is formed so as to extend in the Y1-Y2 direction and to terminate in the middle of the width of the second air bearing surface 22E. In the magnetic head 10K of the eleventh embodiment, the third elevating force control slot 46C is formed so as to extend in the Y1-Y2 direction all the way across the width of the second air bearing surface 22F.

As described above, the third elevating force control slot 46C can be formed at any desired location. The width (dimension in the X1-X2 direction), the length (dimension in the Y1-Y2 direction) and the depth thereof can be set to a desired magnitude. With this, an elevating force of a desired intensity is provided at a desired location of sliders 16J and 16K so that the relative position of the magnetic disk 32 and the magnetic heads 10J and 10K can be optimized. Accordingly, the magnetic heads 10J and 10k, and the magnetic disk 32 are prevented from being damaged in a magnetic reading and writing process so that a proper magnetic reading and writing process can be performed.

What is claimed is:

1. A magnetic head comprising:
    a first magnetic head part for performing a reading and writing process on a first flexible medium;
    a second magnetic head part for performing a reading and writing process on a flexible second medium having a lower coercive force than the first flexible medium; and
    a slider for supporting said first magnetic head part and said second magnetic head part, said slider being provided with a central groove between a first air bearing surface provided with said first magnetic head part and a second air bearing surface provided with said second magnetic head part, the slider being configured such that in a direction perpendicular to a direction in which one of the first flexible medium and the second flexible medium moves, the first air bearing surface has a width A1 at a leading edge thereof facing the approaching medium, and a corresponding width A2 at a trailing edge thereof facing the medium leaving said magnetic head, and the width A2 at the trailing edge is smaller than the width A1 at the leading edge (A1>A2).

2. The magnetic head as claimed in claim 1, wherein at least one of the first air bearing surface and the second air bearing surface is provided with an elevating force control slot extending in a direction perpendicular to the direction in which the medium moves.

3. The magnetic head as claimed in claim 2, wherein the elevating force control slot is provided in the first air bearing surface and the second air bearing surface such that the elevating force control slots formed in the first air bearing surface and the second air bearing surface have an identical width in a direction in which the medium moves.

4. The magnetic head as claimed in claim 2, wherein, given that the central groove has a depth C1 and the elevating control slot has a depth C2, the depth C2 is set to be smaller than the depth C1 (C1>C2).

5. The magnetic head as claimed in claim 2, wherein, given that, in a direction in which the medium moves, the central groove has a width D1 and the second air bearing surface has a width A3, the width D1 is set to be smaller than the width A2 and the width A3 (A2>D1, A3>D1).

6. The magnetic head as claimed in claim 2, wherein the elevating force control slot is formed in a respective air bearing surface so as to be contiguous except at a location of a respective magnetic head part.

7. The magnetic head as claimed in any of claim 1, wherein the number of corners formed at a periphery of said slider is controlled to be minimum.

8. A supporting structure for supporting a pair of opposite magnetic heads, comprising said first and second magnetic heads as described in claim 1, wherein
    the first air bearing surface of said first magnetic head is opposite to the second air bearing surface of said second magnetic head, and the second air bearing surface of said first magnetic head is opposite to the first air bearing surface of said second magnetic head, and wherein a center of a width of the first air bearing surface is substantially aligned with a center of a width of the associated second air bearing surface.

9. A magnetic head according to claim 1, wherein said first and second air bearing surfaces have different shapes and are asymmetrical.

10. A magnetic head comprising:

a first magnetic head part for performing a reading and writing process on a first flexible medium;

a second magnetic head part for performing a reading and writing process on a flexible second medium having a lower coercive force than the first flexible medium; and a slider for supporting said first magnetic head part and said second magnetic head part, said slider being provided with a central groove between a first air bearing surface provided with said first magnetic head part and a second air bearing surface provided with said second magnetic head part, the slider being configured such that in a direction perpendicular to a direction in which one of the first flexible medium and the second flexible medium moves, the central groove has a width B1 at a leading edge thereof facing the approaching medium, and a corresponding width B2 at a trailing edge thereof facing the medium leaving said magnetic head, the width B2 at the trailing edge being larger than the width B1 at the leading edge (B1<B2).

11. The magnetic head as claimed in claim 10, wherein at least one of the first air bearing surface and the second air bearing surface is provided with an elevating force control slot extending in a direction perpendicular to the direction in which the medium moves.

12. The magnetic head as claimed in claim 11, wherein the elevating force control slot is provided in the first air bearing surface and the second air bearing surface such that the elevating force control slots formed in the first air bearing surface and the second air bearing surface have an identical width in a direction in which the medium moves.

13. The magnetic head as claimed in claim 11, wherein, given that the central groove has a depth C1 and the elevating control slot has a depth C2, the depth C2 is set to be smaller than the depth C1 (C1>C2).

14. The magnetic head as claimed in claim 11, wherein, given that, in a direction in which the medium moves, the central groove has a width D1 and the second air bearing surface has a width A3, the width D1 is set to be smaller than the width A2 and the width A3 (A2>D1, A3>D1).

15. The magnetic head as claimed in claim 11 wherein the elevating force control slot is formed in a respective air bearing surface so as to be contiguous except at a location of a respective magnetic head part.

16. The magnetic head as claimed in claim 10, wherein the number of corners formed at a periphery of said slider is controlled to be minimum.

17. A supporting structure for supporting a pair of opposite magnetic heads, comprising said first and second magnetic heads as described in claim 10, wherein the first air bearing surface of said first magnetic head is opposite to the second air bearing surface of said second magnetic head, and the second air bearing surface of said first magnetic head is opposite to the first air bearing surface of said second magnetic head, and wherein a center of a width of the first air bearing surface is substantially aligned with a center of a width of the associated second air bearing surface.

18. A magnetic head according to claim 10, wherein said first and second air bearing surfaces have different shapes and are asymmetrical.

* * * * *